US008518165B2

(12) United States Patent
Furuyama et al.

(10) Patent No.: US 8,518,165 B2
(45) Date of Patent: Aug. 27, 2013

(54) DRY EXHAUST-GAS TREATING APPARATUS

(75) Inventors: Kuninori Furuyama, Tokyo (JP);
Masahiro Miya, Tokyo (JP); Ryo Suzuki, Tokyo (JP)

(73) Assignee: J—Power Entech, Inc., Tokyo (JP)

( * ) Notice: Subject to any disclaimer, the term of this patent is extended or adjusted under 35 U.S.C. 154(b) by 67 days.

(21) Appl. No.: 13/255,078

(22) PCT Filed: Mar. 16, 2009

(86) PCT No.: PCT/JP2009/055078
§ 371 (c)(1),
(2), (4) Date: Sep. 6, 2011

(87) PCT Pub. No.: WO2010/106625
PCT Pub. Date: Sep. 23, 2010

(65) Prior Publication Data
US 2011/0315016 A1    Dec. 29, 2011

(51) Int. Cl.
*B01D 53/02*   (2006.01)

(52) U.S. Cl.
USPC ............. 96/134; 96/136; 96/143; 96/146; 96/150; 95/107; 95/111; 95/275; 95/276

(58) Field of Classification Search
USPC ............. 96/134, 136, 143, 146, 150; 95/107, 95/111, 275, 276
See application file for complete search history.

(56) References Cited

U.S. PATENT DOCUMENTS

| | | | | |
|---|---|---|---|---|
| 2,723,300 A | * | 11/1955 | Lewis, Jr. ....................... | 585/539 |
| 3,459,306 A | * | 8/1969 | Seto et al. .................... | 210/189 |
| 3,864,102 A | * | 2/1975 | Powers ............................ | 95/39 |
| 3,960,529 A | * | 6/1976 | Juntgen et al. .................. | 96/150 |
| 4,017,278 A | * | 4/1977 | Reese ............................. | 95/268 |
| 4,047,906 A | * | 9/1977 | Murakami et al. .............. | 95/109 |

(Continued)

FOREIGN PATENT DOCUMENTS

| JP | 56-45743 A | 4/1981 |
|---|---|---|
| JP | 2000-61253 A | 2/2000 |
| JP | 3725013 B2 | 12/2005 |

OTHER PUBLICATIONS

Translation of JP 3725013 B2, Sumitomo Heavy Industries, Ltd., Dec. 7, 2005.*

(Continued)

*Primary Examiner* — Christopher P Jones
(74) *Attorney, Agent, or Firm* — Nixon Peabody LLP

(57) ABSTRACT

An exhaust-gas treating apparatus, which includes an adsorption tower for removing various harmful substances in an exhaust gas using an adsorbent, a regeneration tower for releasing adsorbed substances from the adsorbent, a first transfer passage for transferring the adsorbent from the adsorption tower to the regeneration tower, a second transfer passage for transferring the adsorbent from the regeneration tower to the adsorption tower, a lock hopper connected to one end of the regeneration tower on a higher differential pressure side of a first differential pressure between an inside of the regeneration tower and an inside of the first transfer passage and a second differential pressure between the inside of the regeneration tower and an inside of the second transfer passage to thereby secure gas-tightness, a sealing unit connected to the other end of the regeneration tower on a lower differential pressure side to thereby secure gas-tightness, and an adjusting unit for maintaining the differential pressure in the sealing unit within a fixed range.

3 Claims, 4 Drawing Sheets

(56) References Cited

U.S. PATENT DOCUMENTS

| | | | |
|---|---|---|---|
| 4,292,054 A * | 9/1981 | Noack et al. | 96/112 |
| 4,306,886 A * | 12/1981 | Clyde | 95/111 |
| 4,744,804 A * | 5/1988 | Furuyama et al. | 95/111 |
| 5,256,174 A * | 10/1993 | Kai et al. | 96/116 |
| 5,344,616 A * | 9/1994 | Bruggendick | 422/171 |
| 6,508,858 B2 * | 1/2003 | Hirose et al. | 95/1 |
| 6,657,096 B2 * | 12/2003 | Boehner et al. | 585/418 |
| 7,014,682 B2 * | 3/2006 | Hickerson et al. | 95/92 |
| 7,258,725 B2 * | 8/2007 | Ohmi et al. | 95/41 |
| 7,285,250 B2 * | 10/2007 | Kanno et al. | 422/171 |
| 7,918,926 B2 * | 4/2011 | Iijima et al. | 96/234 |
| 8,231,719 B2 * | 7/2012 | Yoshiyama et al. | 96/234 |
| 2004/0129605 A1 * | 7/2004 | Goldstein et al. | 208/134 |
| 2006/0162560 A1 * | 7/2006 | Mok et al. | 95/237 |
| 2010/0266477 A1 * | 10/2010 | Ishii | 423/437.1 |

OTHER PUBLICATIONS

International Search Report, PCT/JPP2009/055076, dated May 26, 2009.

International Search Report, PCT/JP2009/055078, dated May 18, 2009.

* cited by examiner

DRY EXHAUST-GAS TREATING APPARATUS

CROSS REFERENCE TO RELATED APPLICATIONS OR PRIORITY CLAIM

This application is a National Phase of PCT/JP2009/055078, filed Mar. 16, 2009, entitled, "DRY EXHAUST-GAS TREATING APPARATUS", the contents of which is incorporated herein by reference in their entirety.

FIELD OF THE INVENTION

The present invention relates to a dry exhaust-gas treating apparatus.

BACKGROUND ART

A dry exhaust-gas treating apparatus for removing various harmful substances in an exhaust gas, such as SOx (sulfur oxide), NOx (nitrogen oxide), and so forth, by bringing the exhaust gas into contact with an adsorbent introduced into an adsorption tower has been known as an apparatus for treating the exhaust gas from a boiler, an incinerator, or a sintering furnace.

Examples of the adsorbent include a carbonaceous adsorbent, an alumina adsorbent, a silica adsorbent, and so forth. The carbonaceous adsorbent is excellent, because it can be treated at a relatively low temperature and remove various harmful substances at the same time. Examples of the carbonaceous adsorbent include activated carbon, activated coke, and so forth. Particularly, the adsorbent pelletized to a size of 0.5 cm to 4 cm is preferable. These adsorbents are well known.

In this apparatus, SOx in the exhaust gas is removed as sulfuric acid by adsorption to the adsorbent. Further, when ammonia is injected into the exhaust gas for pre-treatment, SOx is adsorbed as ammonium salts, and NOx is harmlessly reduced into nitrogen and water by catalysis of the adsorbent. The other harmful components are mainly adsorbed by the adsorbent and removed.

A large quantity of various substances such as sulfuric acid, ammonium salts, and so forth are attached to the adsorbent used for treating the exhaust gas in the adsorption tower, so that the adsorbent has low activity. For this reason, this adsorbent is transferred to a regeneration tower via a transfer passage such as a conveyor, heated and regenerated, and adsorbed substances are released from the adsorbent in the regeneration tower so as to restore the activity of the adsorbent to its original state.

The adsorbent whose activity is restored is transferred back to the adsorption tower via a transfer passage such as a conveyor. When the adsorbent is heated and regenerated, a gas (e.g. a carrier gas) for purging the substances released from the adsorbent may be used. For example, an inert gas such as nitrogen is used.

As a heating and regenerating method in the regeneration tower, a counterflow method of causing a desorbed gas, in which the adsorbed substances are released from the adsorbent, to flow in a direction opposite to a flow direction of the adsorbent that flows down in the regeneration tower standing in a tube shape is known. This counterflow method has an advantage in that initially released ammonia is barely present in the desorbed gas because the released ammonia is adsorbed to the adsorbent again (e.g. see Patent Documents 1 and 2).

As such, when the desorbed gas is sent to byproduct recovery equipment to produce a byproduct such as sulfuric acid or gypsum, it is possible to reduce a load of cleaning equipment, and thus this counterflow method is excellent. Here, the desorbed gas is adjusted so that its pressure is kept constant.

In the dry exhaust-gas treating apparatus disclosed in Patent Document 1, lock hoppers having excellent sealability are provided at both upper and lower ends of the regeneration tower. The lock hoppers regulate the flow of the adsorbent into and out of the regeneration tower, as well as the leakage of the desorbed gas from the regeneration tower and the introduction of oxygen into the regeneration tower.

Further, in the dry exhaust-gas treating apparatus disclosed in Patent Document 2, double rotary valves are disposed at both upper and lower ends of the regeneration tower. An inert gas is injected between the double rotary valves at each end of the regeneration tower. As in the case of Patent Document 1, the leakage of the desorbed gas from the regeneration tower and the introduction of oxygen into the regeneration tower are regulated by a sealing unit.

Patent Document 1: Japanese Patent Application Publication No. 2000-61253
Patent Document 2: Japanese Patent No. 3725013

DISCLOSURE OF THE INVENTION

Problems to be Solved by the Invention

The dry exhaust-gas treating apparatus disclosed in Patent Document 1 can secure high sealability because the lock hoppers are provided at both upper and lower ends of the regeneration tower. However, a height of the regeneration tower could be restricted because the height of the two lock hoppers is required.

An internal pressure of the regeneration tower is dependent on an amount of generation of the desorbed gas. Thus, the amount of generation of the desorbed gas varies depending on the amount of adsorption to the adsorbent in the adsorption tower or a transfer speed of the adsorbent.

Meanwhile, an internal pressure of the adsorption tower is dependent on a flow of exhaust gas, a concentration of dust in the exhaust gas, or a transfer speed of the adsorbent in the adsorption tower. However, a change in the flow of exhaust gas and a change in the amount of adsorption to the adsorbent in the adsorption tower caused by a change in composition of the exhaust gas do not have an influence on the amount of generation of the desorbed gas in the regeneration tower until the adsorbent is transferred from the adsorption tower to the regeneration tower via the transfer passage, such as a conveyor. Typically, the required time ranges from several hours to tens of hours.

As such, even when the desorbed gas is under constant pressure, pressure differences between the regeneration tower and the transfer passages in the front and back of the regeneration tower may vary.

In this case, in the dry exhaust-gas treating apparatus disclosed in Patent Document 2, the variation in pressure in the front and back of the rotary valves continue for a long time, and thus the sealability becomes imperfect. The leakage of the desorbed gas from the regeneration tower and the introduction of oxygen into the regeneration tower cannot be prevented. When the desorbed gas leaks from the regeneration tower to the transfer passage, this causes the corrosion of the transfer passage. Furthermore, when the desorbed gas leaks from the transfer passage to the outside, this becomes an issue of safety.

Further, when a great deal of oxygen flows into the regeneration tower, this becomes an issue because a possibility of the abnormal combustion of the adsorbent causing damage to the inside of the regeneration tower takes place in addition to the excessive consumption of the adsorbent due to abnormal heating and combustion of the adsorbent.

In addition, since the rotary valves are subjected to a reduction in sealability by the temporal wear of their rotors, the amount of leakage of the desorbed gas increases. For this reason, it is necessary to inject a great deal of inert gas for sealing. Equipment supplying the inert gas must be provided for the amount of sealing, making an allowance for the temporal wear of the rotary valves.

The present invention has been made in view of the above-described circumstances, and an objective of this invention is to provide a dry exhaust-gas treating apparatus that is capable of further securing the flexibility of the height of a regeneration tower and responding to a transient or temporal change in sealability between a transfer passage and the regeneration tower.

Means for Solving the Problems

The present invention employs the following means to solve the problems.

A dry exhaust-gas treating apparatus according to the present invention includes an adsorption tower configured to remove harmful substances in an exhaust gas using an adsorbent, a regeneration tower configured to release adsorbed substances from the adsorbent, a first transfer passage configured to transfer the adsorbent from the adsorption tower to the regeneration tower, a second transfer passage configured to transfer the adsorbent from the regeneration tower to the adsorption tower, a lock hopper connected to one end of the regeneration tower on a higher differential pressure side of a first differential pressure between an inside of the regeneration tower and an inside of the first transfer passage and a second differential pressure between the inside of the regeneration tower and an inside of the second transfer passage to thereby secure gas-tightness, a sealing unit connected to the other end of the regeneration tower on a lower differential pressure side to thereby secure gas-tightness, and an adjusting unit configured to maintain the differential pressure in the sealing unit within a fixed range.

Since the lock hopper is disposed only at any one of ends of the regeneration tower, it is possible to reduce a height of the entire apparatus, compared to the case where the lock hoppers are disposed at opposite ends of the regeneration tower.

Further, since the differential pressure in the sealing unit is maintained within a fixed range by the adjusting unit, it is possible to control the pressure applied to the sealing unit to be within a fixed range. Thus, it is possible to maintain gas-tightness between the upstream and downstream of the sealing unit regardless of a transient or temporal change of the sealing unit.

Further, the dry exhaust-gas treating apparatus according to the present invention is the aforementioned dry exhaust-gas treating apparatus, and is configured so that the adjusting unit is disposed on a desorbed gas discharge passage through which a desorbed gas including substances released from the adsorbent is discharged from the regeneration tower.

When the first or second differential pressure exceeds a fixed range due to an increase in pressure inside the regeneration tower, it is possible to change the pressure inside the regeneration tower by adjusting the adjusting unit, and to maintain the differential pressure in the sealing unit within the fixed range.

Effects of the Invention

According to the present invention, it is possible to further secure a flexibility of the height of a regeneration tower. It is possible to maintain sealability for a long period by respoding to a transient or temporal change in sealability between a transfer passage and the regeneration tower. Further, it is possible to reduce components such as a lock hopper, a rotary valve, an inert gas line for sealing the rotary valve, and so forth.

Figure 1:
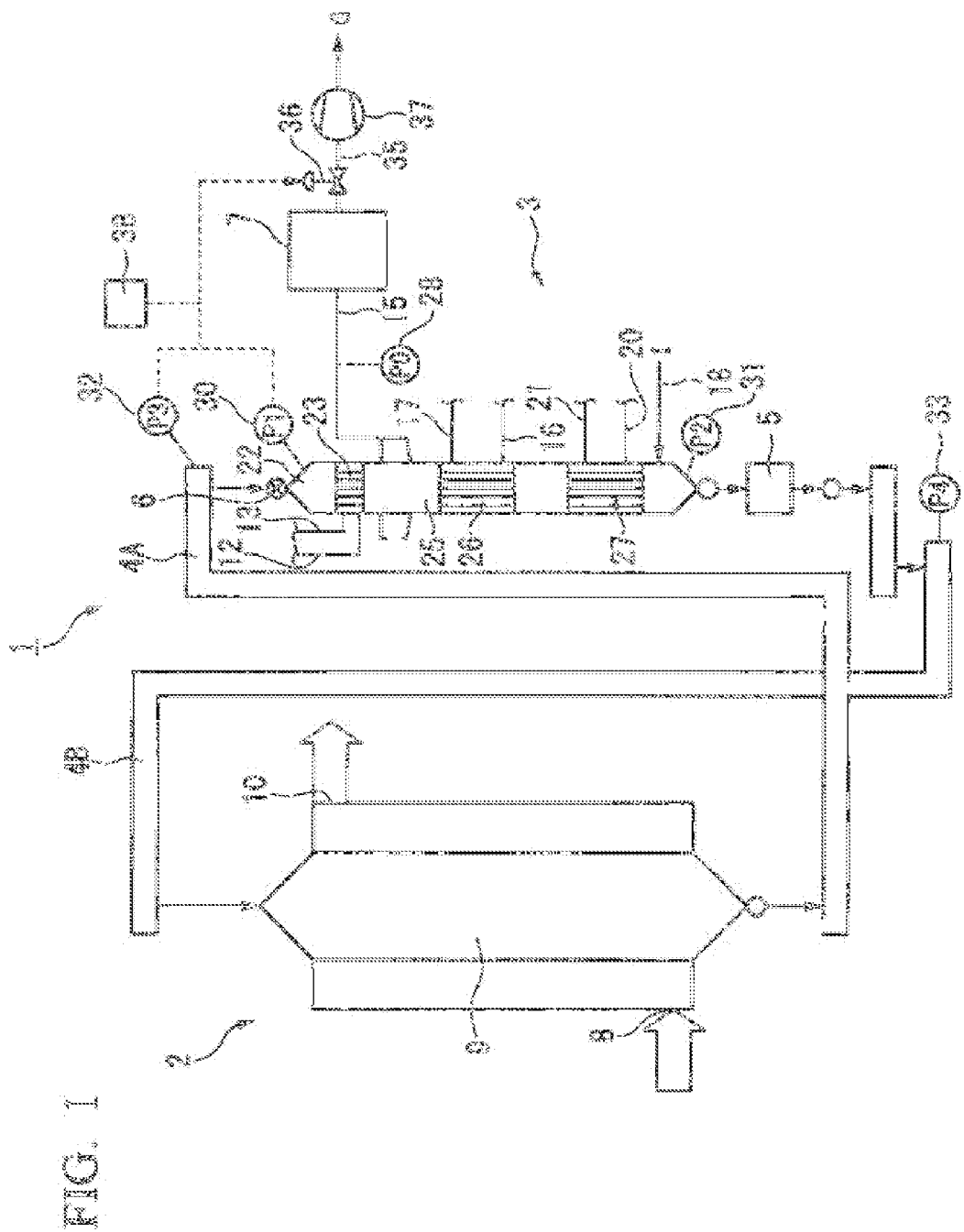
FIG. 1 is a functional block diagram showing a dry exhaust-gas treating apparatus according to a first embodiment of the present invention.

DESCRIPTION OF REFERENCE NUMERALS 1, 40, 50, 60: dry exhaust-gas treating apparatus
2, 51: adsorption tower
3: regeneration tower
4A: first transfer passage
4B: second transfer passage
5: lock hopper
6: rotary valve (sealing unit)
15: desorbed gas discharge passage
36: control valve (adjusting unit)

BEST MODE FOR CARRYING OUT THE INVENTION

Hereinafter, embodiments of a dry exhaust-gas treating apparatus according to the present invention will be described with reference to the drawings.

FIG. 1 is a functional block diagram showing a dry exhaust-gas treating apparatus according to a first embodiment.

The dry exhaust-gas treating apparatus 1 according to the first embodiment includes an adsorption tower 2, a regeneration tower 3, first and second transfer passages 4A and 4B that connect the adsorption tower 2 and the regeneration tower 3 to transfer an adsorbent, a lock hopper 5 connected to a lower end side of the regeneration tower 3, a rotary valve (or a sealing unit) 6 connected to an upper end side of the regeneration tower 3, and a cleaning tower 7 that cleans a desorbed gas G including desorbed substances released from the adsorbent.

The adsorption tower 2 is used to adsorb and remove various substances in gas such as SOx (sulfur oxide) using an adsorbent. The adsorbent includes, for instance, a carbonaceous adsorbent, an alumina adsorbent, a silica adsorbent, and so forth.

An exhaust gas introduction port 8 through which an exhaust gas is introduced, an adsorption tower main body 9 that brings the exhaust gas into contact with the adsorbent, and an exhaust gas discharge port 10 through which the exhaust gas from which various substances are adsorbed and removed flows out of the adsorption tower main body 9 are disposed at the adsorption tower 2.

The regeneration tower 3 is provided with a regeneration tower main body 11 having a tube shape; and a preheated gas introduction passage 12, a preheated gas discharge passage 13, a desorbed gas discharge passage 15, a heated gas introduction passage 16, a heated gas discharge passage 17, an inert gas introduction passage 18, a cooling medium introduction passage 20, and a cooling medium discharge passage 21 which are connected to the regeneration tower main body 11.

As in the related art, the regeneration tower main body 11 is provided with a storage chamber 22, a preheating chamber 23, a separation chamber 25, a heating chamber 26, and a cooling chamber 27. The separation chamber 25 is disposed at an upper portion of the heating chamber 26 (an upward extraction type of the desorbed gas).

The adsorbent, which is used to treat the exhaust gas in the adsorption tower 2 and adsorbs various substances, is stored in the storage chamber 22 for a while.

The preheated gas introduction passage 12 that introduces a preheated gas into the preheating chamber 23 and the preheated gas discharge passage 13 that discharges the preheated gas after preheating from the preheating chamber 23 are connected to the preheating chamber.

The adsorbent is gradually heated to a temperature of about 180° C. (in the case of the carbonaceous adsorbent) in the preheating chamber 23 by heat exchange with the preheated gas.

The desorbed gas discharge passage 15 is connected to the separation chamber 25. The desorbed gas discharge passage 15 discharges the desorbed substances, which have been separated from the adsorbent as the desorbed gas G along with an inert gas I.

The heated gas introduction passage 16 that introduces a heated gas into the heating chamber 26 and the heated gas discharge passage 17 that discharges the heated gas after heating from the heating chamber 26 are connected to the heating chamber 26. In the heating chamber 26, the adsorbent to which various substances are adsorbed is heated through the heated gas to a high temperature of 400° C. or more, preferably 450° C. or so (in the case of the carbonaceous adsorbent), and the adsorbed substances are released.

The cooling medium introduction passage 20 that introduces a cooling medium into the cooling chamber 27, and the cooling medium discharge passage 21 through which the cooling medium after cooling is discharged, are connected to the cooling chamber 27.

Air, water, and so forth are used as the cooling medium. The adsorbent from which the desorbed substances are released is cooled by heat exchange with the cooling medium in the cooling chamber 27.

The first transfer passage 4A transfers the adsorbent from the adsorption tower 2 to the regeneration tower 3, while the second transfer passage 4B transfers the adsorbent from the regeneration tower 3 to the adsorption tower 2.

A pressure gauge 28, which detects an internal pressure of the desorbed gas discharge passage 15, is disposed in the desorbed gas discharge passage 15. A pressure gauge 30, which detects an internal pressure of the storage chamber 22, is disposed in the storage chamber 22. A pressure gauge 31, which detects an internal pressure of the regeneration tower main body 11, is disposed on a lower end side of the regeneration tower main body 11. A pressure gauge 32, which detects an internal pressure of the first transfer passage 4A, is disposed in the first transfer passage 4A. A pressure gauge 33, which detects the internal pressure of the second transfer passage 4B, is disposed in the second transfer passage 4B.

Here, if the pressure in the desorbed gas discharge passage 15 is denoted by P0, the pressure in the storage chamber 22 by P1, the pressure in the lower end side of the regeneration tower main body 11 by P2, the pressure in the first transfer passage 4A by P3, the pressure in the second transfer passage 4B by P4, a differential pressure between the inside of the regeneration tower 3 and the inside of the first transfer passage 4A by a first differential pressure, and a differential pressure between the inside of the regeneration tower 3 and the inside of the second transfer passage 4B by a second differential pressure, the first differential pressure and the second differential pressure are denoted by P1-P3 and P2-P4, respectively.

A magnitude relationship of the pressures is P0<P1<P2, and P3 and P4 are approximately equal to each other.

To prevent oxygen from flowing into the regeneration tower 3, P3 is preferably set to be lower than P1.

Hereinafter, the case where the second differential pressure is greater than the first differential pressure (i.e. the case where the inside of the regeneration tower 3 is mainly set to a positive pressure) will be described.

The lock hopper 5 whose configuration is known is connected to one end of the regeneration tower 3 on the side of the second transfer passage 4B in order to secure sealability between the second transfer passage 4B and the regeneration tower 3.

Further, the rotary valve 6 is connected to the other end of the regeneration tower 3 on the side of the first transfer passage 4A in order to secure sealability between the first transfer passage 4A and the regeneration tower 3.

The cleaning tower 7 is connected to the desorbed gas discharge passage 15, and cleans the desorbed gas G. A gas pipe 35, which discharges the desorbed gas G after cleaning, is connected to the cleaning tower 7. A control valve (or an adjusting unit) 36 that maintains the first differential pressure within a fixed range and a fan 37 are connected to the gas pipe 35. The control valve 36 is electrically connected to the pressure gauges 30 and 32 via a control unit 38.

Next, operations of the dry exhaust-gas treating apparatus 1 according to the first embodiment will be described.

The exhaust gas introduced from the exhaust gas introduction port 8 into the adsorption tower 2 is subjected to removal of various harmful substances in the adsorption tower main body 9. The various harmful substances in the exhaust gas such as sulfur oxide are adsorbed to the adsorbent, and are removed from the exhaust gas.

The exhaust gas is discharged from the exhaust gas discharge port 10 into the air via a chimney (not shown) directly or after another gas treatment is performed.

Meanwhile, the adsorbent, which adsorbs the adsorbed substances, is transferred to the regeneration tower 3 via the first transfer passage 4A.

The transferred adsorbent is introduced into the storage chamber 22, and then transferred to the preheating chamber 23. The adsorbent is heat-exchanged with the preheated gas introduced from the preheated gas introduction passage 12 into the preheating chamber 23, and the adsorbent, which adsorbs the adsorbed substances, is preheated to a temperature of about 180° C. (in the case of the carbonaceous adsorbent). The preheated gas after preheating is discharged from the preheating chamber 23 via the preheated gas discharge passage 13.

The adsorbent, which is transferred from the preheating chamber 23 to the heating chamber 26, is heated to a temperature of 400° C. or more (in the case of the carbonaceous adsorbent) by heat exchange with the heated gas introduced from the heated gas introduction passage 16 into the heating chamber 26. Thereby, the adsorbed substances are released from the adsorbent.

The heated gas after heating is discharged from the heating chamber 26 via the heated gas discharge passage 17.

The desorbed substances, which are released from the adsorbent, flows upward along with the inert gas I, and discharged from the separation chamber 25 via the desorbed gas discharge passage 15 as the desorbed gas G.

Thereafter, the adsorbent moves to the cooling chamber 27. The adsorbent is cooled by heat exchange with a cooling medium introduced from the cooling medium introduction passage 20. The cooling medium after cooling is discharged from the cooling chamber 27 via the cooling medium discharge passage 21.

The desorbed gas G, which is discharged from the separation chamber 25 via the desorbed gas discharge passage 15, is sent to the cleaning tower 7.

An amount of adsorption of the adsorbent is changed by a change in the flow of the exhaust gas. With this change, the amount of generation of desorbed gas G in the regeneration tower 3 varies. When P1 is raised and the first differential pressure (P1-P3) exceeds a predetermined range, the degree of opening of the control valve 36 is adjusted by an instruction of the control unit 38.

Thereby, P1 is lowered, and the first differential pressure falls within the predetermined range. Further, with regard to a change in the second differential pressure, the lock hopper 5 secures sealability between the second transfer passage 4B and the regeneration tower 3, and the leakage of the desorbed gas from a lower portion of the regeneration tower and the introduction of oxygen into the regeneration tower do not take place.

As described above, according to the dry exhaust-gas treating apparatus 1, the first differential pressure in the rotary valve 6 is maintained within a fixed range by the control valve 36. As such, the pressure applied to the rotary valve 6 can be controlled within the fixed range. Thus, a possibility of the desorbed gas flowing up from the separation chamber 25 to the preheating chamber 23 and the storage chamber 22 can be kept to a minimum.

Even when the upflow of the desorbed gas from the separation chamber 25 toward the top takes place in this way, an amount of upflow of the desorbed gas is very small. Further, since the desorbed substances are sufficiently adsorbed again to the adsorbent stored in the storage chamber 22 and the adsorbent flowing down in the preheating chamber 23, the leakage of the desorbed gas from the regeneration tower 3 toward the top does not take place.

In other words, it is possible to maintain the sealability between the upstream and downstream of the rotary valve 6 by responding to a transient change in the sealability of the rotary valve 6. The sealability of the rotary valve 6 is also reduced by temporal wear of the rotary valve 6. However, it is possible to respond to this temporal change. Further, the rotary valve can be one in number because the first differential pressure is maintained within the fixed range. In comparison with the case of Patent Document 2, the dry exhaust-gas treating apparatus 1 can reduce the number of components such as a rotary valve, an inert gas line for sealing the rotary valve, and so forth.

Further, since the lock hopper 5 is disposed only on the lower end side of the regeneration tower 3, it is possible to reduce a height of the entire apparatus, compared to the case where the lock hoppers are disposed at both upper and lower ends of the regeneration tower 3. Thus, it is possible to further secure the flexibility of the height of the regeneration tower 3.

In particular, since the control valve 36 is disposed in the desorbed gas discharge passage 15, it is possible to easily change the pressure inside the regeneration tower 3 by adjusting the control valve 36 when the first differential pressure exceeds a fixed range due to an increase in the pressure inside the regeneration tower 3. Thus, it is possible to maintain the first differential pressure within the fixed range.

Next, a second embodiment will be described with reference to FIG. 2.

Figure 2:
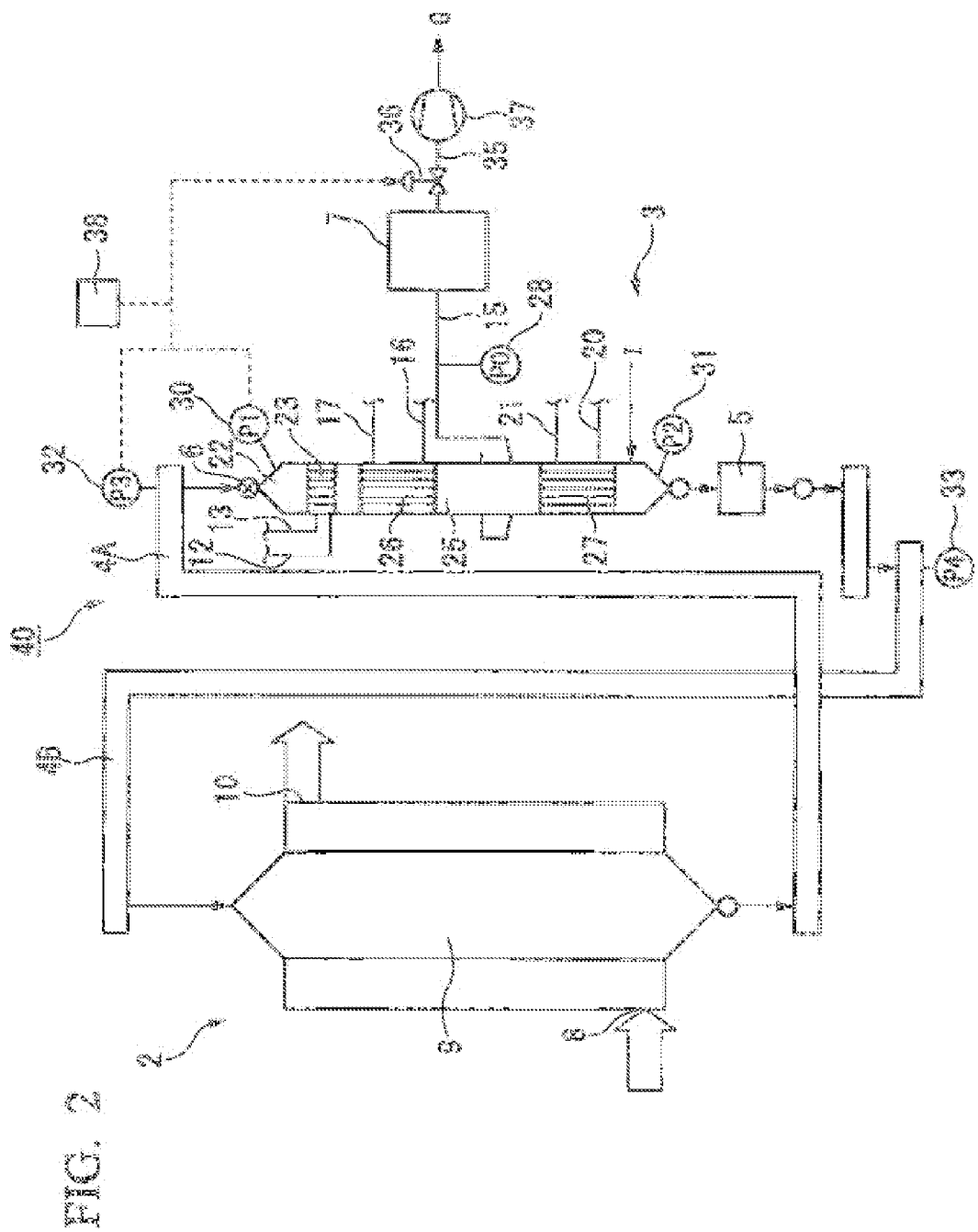
FIG. 2 is a functional block diagram showing a dry exhaust-gas treating apparatus according to a second embodiment of the present invention.

FIG. 2 is a functional block diagram showing a dry exhaust-gas treating apparatus according to a second embodiment.

Further, components similar to those of the first embodiment are given the same numerals, and descriptions thereof will be omitted.

A difference between the second embodiment and the first embodiment is the arrangement of a separation chamber 25 and a heating chamber 26. A regeneration tower 3 of the dry exhaust-gas treating apparatus 40 according to the second embodiment is configured so that the arrangement of the separation chamber 25 and the heating chamber 26 is reversed in a vertical direction from the first embodiment (a downward extraction type of the desorbed gas).

In this case, a magnitude relationship of the pressures is P0<P2<P1, and P3 and P4 are approximately equal to each other. The remaining configuration is similar to that of the first embodiment.

According to the dry exhaust-gas treating apparatus 40, when a second differential pressure is greater than a first differential pressure, it is possible to exert operation and effects similar to those of the first embodiment.

Next, a third embodiment will be described with reference to FIG. 3.

Figure 3:
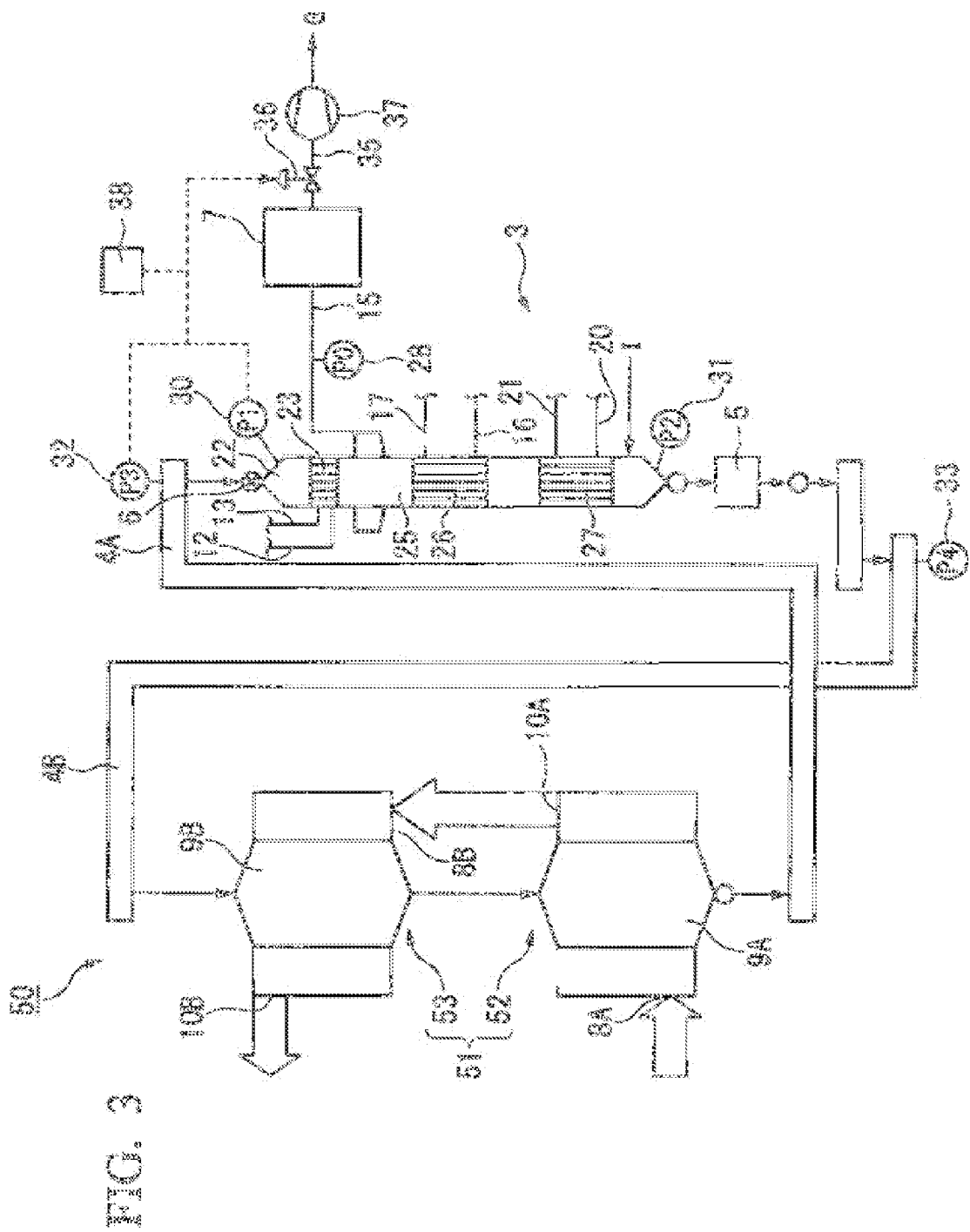
FIG. 3 is a functional block diagram showing a dry exhaust-gas treating apparatus according to a third embodiment of the present invention.

FIG. 3 is a functional block diagram showing a dry exhaust-gas treating apparatus according to a third embodiment.

Further, components similar to those of the other embodiments are given the same numeral, and descriptions thereof will be omitted.

A difference between the third embodiment and the first embodiment is the configuration of an adsorption tower 51. The adsorption tower 51 of the dry exhaust-gas treating apparatus 50 according to the third embodiment is configured in two, upper and lower, stages of a first adsorption tower 52 and a second adsorption tower 53.

The first adsorption tower 52 is provided with an exhaust gas introduction port 8A into which an exhaust gas is introduced, an adsorption tower main body 9A that brings an adsorbent into contact with the exhaust gas, and an exhaust gas discharge port 10A through which the exhaust gas from which various substances are adsorbed and removed flows out of the adsorption tower main body 9A.

The second adsorption tower 53 is provided with an exhaust gas introduction port 8B into which the exhaust gas discharged from the first adsorption tower 52 is introduced, an adsorption tower main body 9B that brings an adsorbent into contact with the exhaust gas, and an exhaust gas discharge port 10B through which the exhaust gas from which various substances are further removed flows out of the adsorption tower main body 9B. In this case, P3 is set to be higher than P4.

Next, operations of the dry exhaust-gas treating apparatus 50 according to the third embodiment will be described.

The exhaust gas introduced from the exhaust gas introduction port 8A into the first adsorption tower 52 is subjected to removal of various harmful substances in the adsorption tower main body 9A. The various harmful substances in the exhaust gas such as sulfur oxide are adsorbed to the adsorbent, and removed from the exhaust gas.

Thereafter, the exhaust gas is introduced into the adsorption tower main body 9B of the second adsorption tower 53 from the exhaust gas discharge port 10A via the exhaust gas introduction port 8B, and subjected to further removal of the various harmful substances in the adsorption tower main body 9B by the adsorbent. Particularly, when the sulfur oxide is sufficiently removed in the first adsorption tower 52, the decomposition of nitrogen oxide is accelerated in the second adsorption tower 53 by injecting ammonia into the exhaust gas.

The exhaust gas is discharged from a chimney (not shown) into the air directly or after another gas treatment is performed.

Meanwhile, the adsorbent, which adsorbs the adsorbed substances, is transferred to a regeneration tower 3 via a first transfer passage 4A.

Afterwards, treatment similar to that of the first embodiment is performed.

This dry exhaust-gas treating apparatus 50 can also exert effects similar to those of the first embodiment. Further, although the adsorption tower is configured in two, upper and lower, stages in FIG. 3, it may be configured in two, front and rear, stages or in two, left and right, stages, which can obtain similar effects.

Next, a fourth embodiment will be described with reference to FIG. 4.

Figure 4:
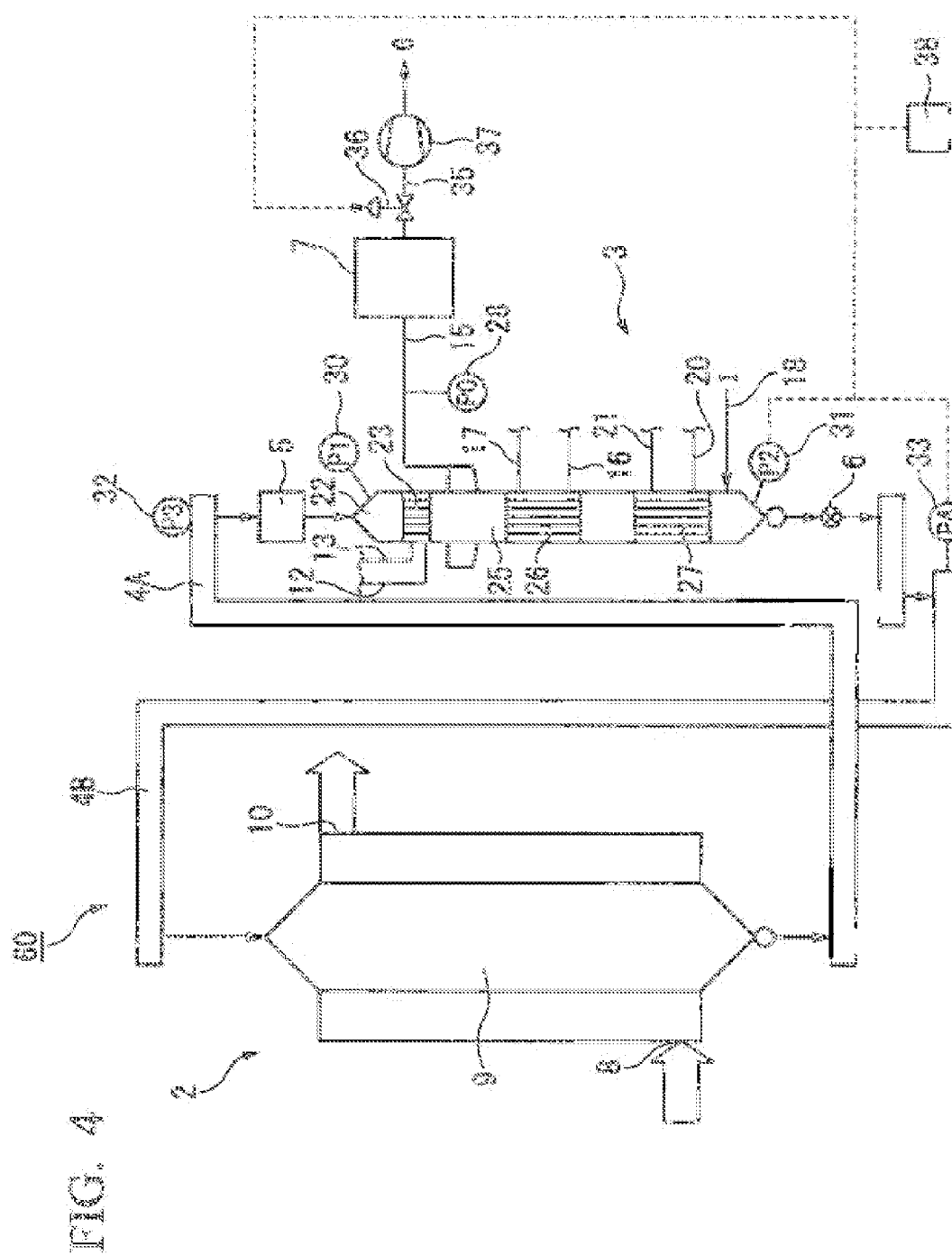
FIG. 4 is a functional block diagram showing a dry exhaust-gas treating apparatus according to a fourth embodiment of the present invention.

FIG. 4 is a functional block diagram showing a dry exhaust-gas treating apparatus according to a fourth embodiment.

Further, components similar to those of the other embodiments are given the same numerals, and descriptions thereof will be omitted.

A difference between the fourth embodiment and the first embodiment is the arrangement of a lock hopper 5 and a rotary valve 6. In the dry exhaust-gas treating apparatus 60 according to the fourth embodiment, the lock hopper 5 is connected to an upper end side of a regeneration tower 3, and the rotary valve 6 is connected to a lower end side of the regeneration tower 3.

The fourth embodiment is an upward extraction type of the desorbed gas, and is applied to the case where a first differential pressure is greater than a second differential pressure (i.e. the case where the inside of the regeneration tower 3 is mainly set to a negative pressure). In this case, positions at which the lock hopper 5 and the rotary valve 6 are disposed are reversed in a vertical direction from the first embodiment.

A relationship of the pressures is the same as in the first embodiment. In this case, P2 is set to be lower than P4. The introduction of oxygen into the regeneration tower 3 is prevented by introduction of an inert gas I.

Operations of this dry exhaust-gas treating apparatus 60 will be described.

As in the first embodiment, the adsorbent, which adsorbs various harmful substances such as sulfur oxide in an adsorption tower 2, is transferred to the regeneration tower 3 via a first transfer passage 4A. As in the first embodiment, the adsorbent is heated and regenerated in the regeneration tower 3.

At this time, an amount of adsorption of the adsorbent is changed by a change in the flow of the exhaust gas. With this change, an amount of generation of a desorbed gas G in the regeneration tower 3 varies. When P2 is raised and the second differential pressure (P2-P4) exceeds a predetermined range, a degree of opening of an control valve 36 is adjusted.

Thereby, P2 is lowered, and the second differential pressure falls within the predetermined range. Further, with regard to a change in the first differential pressure, the lock hopper 5 secures sealability between the first transfer passage 4A and the regeneration tower 3, and the leakage of the desorbed gas from the top portion of the regeneration tower and the introduction of oxygen into the regeneration tower do not take place.

As described above, according to the dry exhaust-gas treating apparatus 60, the second differential pressure in the rotary valve 6 is maintained within a fixed range by the control valve 36. As such, the pressure applied to the rotary valve 6 can be controlled within the fixed range. Thus, a possibility of the desorbed gas flowing down from a heating chamber 26 to a cooling chamber 27 can be kept to a minimum.

Further, even when the downflow of the desorbed gas from the heating chamber 26 toward the bottom takes place, an amount of downflow of the desorbed gas is very small. Further, since the inert gas I is introduced from the bottom, the leakage of the desorbed gas from the regeneration tower 3 toward the bottom does not take place.

In other words, it is possible to maintain the sealability between the upstream and downstream of the rotary valve 6 by responding to a transient change in the sealability of the rotary valve 6. It is also possible to respond to a temporal change in the sealability of the rotary valve 6. Further, the rotary valve can be one in number because the second differential pressure is maintained within the fixed range. In comparison with the case of Patent Document 2, the dry exhaust-gas treating apparatus 60 can reduce the number of components such as a rotary valve, an inert gas line for sealing the rotary valve, and so forth.

The technical scope of the invention is not limited to the aforementioned embodiments. Various modifications may be made without departing from the scope of the invention.

INDUSTRIAL APPLICABILITY

A dry exhaust-gas treating apparatus according to the present invention is applied to apparatuses for treating exhaust gases from boilers, incinerators, or sintering furnaces. The dry exhaust-gas treating apparatus according to the present invention can make it easy to further secure the flexibility of a height of a regeneration tower, and respond to a transient or temporal change in sealability between a transfer passage and the regeneration tower.

The invention claimed is:

1. A dry exhaust-gas treating apparatus comprising:
   an adsorption tower configured to remove harmful substances in an exhaust gas using an adsorbent;
   a regeneration tower configured to release adsorbed substances from the adsorbent;
   a first transfer passage configured to transfer the adsorbent from the adsorption tower to the regeneration tower;
   a second transfer passage configured to transfer the adsorbent from the regeneration tower to the adsorption tower;
   a lock hopper connected only at any one of ends of the regeneration tower;
   a rotary valve connected only at the other end of the regeneration tower;
   a desorbed gas discharge passage through which a desorbed gas including desorbed substances from the adsorbent is discharged from the regeneration tower;
   an adjusting unit is disposed on the desorbed gas discharge passage;
   a pair of pressure gauges which detect a differential pressure in the rotary valve; and
   a control unit which adjusts the degree of opening of the adjusting unit when the differential pressure exceeds a predetermined range and which maintained the differential pressure in the rotary valve within a fixed range.

2. The dry exhaust-gas treating apparatus according to claim 1, wherein the inside of the regeneration tower is mainly set to a negative pressure, the lock hopper is connected between the first transfer passage and the regeneration tower, the rotary valve is connected between the second transfer passage and the regeneration tower.

3. The dry exhaust-gas treating apparatus according to claim 1, further comprising a cleaning tower connected to the desorbed gas discharge passage, and cleans the desorbed gas.

* * * * *